United States Patent
Fujita et al.

(10) Patent No.: US 12,528,495 B2
(45) Date of Patent: Jan. 20, 2026

(54) VEHICLE CONTROL DEVICE AND VEHICLE CONTROL METHOD

(71) Applicant: TOYOTA JIDOSHA KABUSHIKI KAISHA, Toyota (JP)

(72) Inventors: Koichi Fujita, Toyota (JP); Jun Tohyama, Nisshin (JP); Daisuke Akaho, Nagoya (JP); Yuta Maniwa, Susono (JP); Natsumi Izawa, Kariya (JP); Shunichiroh Sawai, Tokyo-to (JP); Masahiko Nakamura, Okazaki (JP); Kenichiro Aoki, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 18/629,277

(22) Filed: Apr. 8, 2024

(65) Prior Publication Data
US 2024/0367669 A1 Nov. 7, 2024

(30) Foreign Application Priority Data
May 1, 2023 (JP) .................. 2023-075848

(51) Int. Cl.
*B60Q 1/00* (2006.01)
*B60K 35/28* (2024.01)
*B60R 25/04* (2013.01)
*B60R 25/25* (2013.01)
*B60W 50/14* (2020.01)
(Continued)

(52) U.S. Cl.
CPC .............. *B60W 50/14* (2013.01); *B60K 35/28* (2024.01); *B60R 25/04* (2013.01); *B60R 25/25* (2013.01); *B60W 60/001* (2020.02); *G06V 40/172* (2022.01); *H04W 4/48* (2018.02); *B60K 2360/566* (2024.01); *B60K 2360/589* (2024.01); *B60R 2325/205* (2013.01);
(Continued)

(58) Field of Classification Search
CPC .............. B60W 50/14; B60W 60/001; B60W 2050/143; B60W 2050/146; B60W 2540/043; B60K 35/28; B60K 2360/566; B60K 2360/589; B60R 25/04; B60R 25/25; B60R 2325/205; G06V 40/172; H04W 4/48
USPC ................. 340/425.5, 439, 438, 457, 426.13
See application file for complete search history.

(56) References Cited

U.S. PATENT DOCUMENTS

2018/0345980 A1 12/2018 Morita et al.
2019/0082378 A1* 3/2019 Dziurda .................. H04W 4/48
(Continued)

FOREIGN PATENT DOCUMENTS

JP 2020-102252 A 7/2020

*Primary Examiner* — Anh V La
(74) *Attorney, Agent, or Firm* — Oliff PLC

(57) ABSTRACT

A vehicle control device includes at least one processor, the processor being configured to: in a vehicle configured to enable autonomous travel control that permits a driver to behave in a manner in which it is not possible to check surroundings of the vehicle, determine whether or not a portable terminal configured to receive notification of vehicle information is present inside a vehicle cabin before the autonomous travel control is executed; and in a case in which it has been determined that the portable terminal is not present inside the vehicle cabin, provide notification, via an onboard unit, that notification of the vehicle information cannot be provided from the portable terminal.

6 Claims, 9 Drawing Sheets

(51) Int. Cl.
*B60W 60/00* (2020.01)
*G06V 40/16* (2022.01)
*H04W 4/48* (2018.01)

(52) U.S. Cl.
CPC . *B60W 2050/143* (2013.01); *B60W 2050/146* (2013.01); *B60W 2540/043* (2020.02)

(56) References Cited

U.S. PATENT DOCUMENTS

| | | | |
|---|---|---|---|
| 2019/0126942 A1* | 5/2019 | Goto | B60W 40/08 |
| 2019/0193749 A1* | 6/2019 | Choi | H04L 69/14 |
| 2020/0062265 A1* | 2/2020 | Wunderlich | B60W 40/08 |
| 2020/0103918 A1* | 4/2020 | Lee | G05D 1/0088 |

* cited by examiner

FIG.6

| CLASSIFICATION OF NOTIFICATIONS | EVENT ITEMS | USER ACTION |
|---|---|---|
| DRIVING CHANGE WARNING | DEPARTURE FROM AUTONOMOUS DRIVING AREA | IMMEDIATE RESPONSE REQUIRED |
| | ENCOUNTER WITH HAZARDOUS SITUATION | |
| | SYSTEM FAILURE/MALFUNCTION | |
| | SUDDEN WEATHER DETERIORATION | |
| | AUTONOMOUS DRIVING LEVEL TRANSITION (LOWER) | |
| | ACCIDENT | |
| DRIVING CHANGE NOTIFICATION | DEPARTURE FROM AUTONOMOUS DRIVING AREA | RESPONSE REQUIRED BY MANUAL DRIVING AREA |
| | ENCOUNTER WITH HAZARDOUS SITUATION | |
| | SYSTEM FAILURE/MALFUNCTION | |
| | SUDDEN WEATHER DETERIORATION | |
| | AUTONOMOUS DRIVING LEVEL TRANSITION (LOWER) | |
| | ACCIDENT | |
| SYSTEM STATE, TRANSITION (MRM) | TRANSITION TO MRM | NONE |
| SYSTEM STATE, TRANSITION (MRC) | TRANSITION TO MRC | NONE |
| FUNCTIONAL PROPOSAL FROM SYSTEM | OVERTAKING | APPROVAL |
| | PASSING (LANE CHANGE) | |
| | AUTONOMOUS DRIVING LEVEL TRANSITION (HIGHER) | |
| | ROUTE SELECTION (IN COOPERATION WITH NAVIGATION SYSTEM) | |
| | DECELERATION AT TOLL GATE | |
| VEHICLE STATE NOTIFICATION | REMAINING BATTERY AMOUNT | ONLY NOTIFICATION |
| | REMAINING FUEL AMOUNT | |

VEHICLE CONTROL DEVICE AND VEHICLE CONTROL METHOD

CROSS-REFERENCE TO RELATED APPLICATION

This application is based on and claims priority under 35 USC 119 from Japanese Patent Application No. 2023-075848 filed on May 1, 2023, the disclosure of which is incorporated by reference herein.

BACKGROUND

Technical Field

The present disclosure relates to a vehicle control device and a vehicle control method.

Related Art

Japanese Patent Application Laid-open (JP-A) No. 2020-102252 describes a technique for sounding an alarm from speakers installed in portable terminals and vehicles in a case in which a driver operates a portable terminal during travel by autonomous driving.

When autonomous travel (autonomous driving) of a vehicle is performed under predetermined conditions, it is assumed that the driver is temporarily relieved from the obligation to pay attention to the forward direction, and that behavior in a manner in which it is not possible to check the surroundings of the vehicle, such as operation of a portable terminal, is permitted.

However, in this kind of autonomous travel, the driver must return to driving at any time in response to a request from the autonomous travel system. In such a case, it is possible to provide the driver with notifications of information relating to autonomous travel or a make request to the driver using the portable terminal.

In order to notify the driver via the portable terminal in an appropriate manner, before execution of autonomous travel control of a predetermined level or higher that would permit the driver to behave in a manner in which it is not possible to check the surroundings of the vehicle, it is desirable to prompt the driver to check that the portable terminal is present inside the vehicle cabin.

SUMMARY

In consideration of the foregoing circumstances, in a vehicle capable of autonomous travel control that permits a driver to behave in a manner in which it is not possible to check the surroundings of the vehicle, the present disclosure aims to provide a vehicle control device and a vehicle control method capable of prompting a driver to check whether or not a portable terminal that receives notification of vehicle information is present inside a vehicle cabin.

A vehicle control device according to a first aspect of the present disclosure includes: a determination section that, in a vehicle configured to enable autonomous travel control that permits a driver to behave in a manner in which it is not possible to check the surroundings of the vehicle, determines whether or not a portable terminal configured to receive notification of vehicle information is present inside a vehicle cabin before the autonomous travel control is executed; and a notification section that, in a case in which it has been determined at the determination section that the portable terminal is not present inside the vehicle cabin, provides notification, via an onboard unit, that notification of the vehicle information cannot be provided from the portable terminal.

In the vehicle control device according to the first aspect of the present disclosure, before autonomous travel control that permits a driver to behave in a manner in which it is not possible to check the surroundings of the vehicle is executed, it is determined whether or not a portable terminal that receives notification of vehicle information is present inside the vehicle cabin. Moreover, in a case in which it is determined that the portable terminal is not present inside the vehicle cabin, notification is provided, via an onboard unit, that notification of vehicle information cannot be provided from the portable terminal. As a result, the driver can be prompted to check whether or not the portable terminal is present inside the vehicle cabin.

A vehicle control device according to a second aspect of the present disclosure is the configuration described in the first aspect, in which the determination section determines that the portable terminal is present inside the vehicle cabin in a case in which the vehicle and the portable terminal are communicably connected to each other in accordance with a predetermined communication protocol.

In the vehicle control device according to the second aspect of the present disclosure, in a case in which the vehicle and the portable terminal are connected so as to be capable of communicating with each other, it is determined that the portable terminal is present inside the vehicle cabin. Since, as a result, it is determined that the portable terminal is present inside the vehicle cabin in a case in which the portable terminal is in a state in which it can receive notification of vehicle information, the portable terminal can reliably receive vehicle information, enabling safety during autonomous travel to be increased.

A vehicle control device according to a third aspect of the present disclosure is the configuration described in the first aspect, in which the determination section determines that the portable terminal is present inside the vehicle cabin in a case in which a detection value of an onboard sensor installed in the vehicle and a detection value of a terminal sensor installed in the portable terminal match with respect to a predetermined physical quantity.

In the vehicle control device according to the third aspect of the present disclosure, a predetermined physical quantity is detected using an onboard sensor installed in the vehicle and a terminal sensor installed in the portable terminal. In a case in which the detection values of these sensors coincide with each other, the portable terminal is determined to be present inside the vehicle cabin. Namely, a case in which the detection values of the sensors are a match indicates that the portable terminal is disposed in the same environment as the vehicle. Since, as a result, it can be determined whether or not the portable terminal is present inside the vehicle cabin in consideration of whether or not the environment surrounding the portable terminal matches the environment inside the vehicle cabin, it is possible to perform highly accurate determination.

Note that "a case in which the detection values of the sensors are a match" as used herein is not limited to cases in which the detection values perfectly coincide, and represents a broad concept also encompassing cases in which they coincide within a predetermined error range.

A vehicle control device according to a fourth aspect of the present disclosure is the configuration described in any one of the first aspect to the third aspect, further including an execution section that executes the autonomous travel control, in which the execution section enables execution of the autonomous travel control in a case in which it has been determined that the portable terminal is present inside the vehicle cabin.

In the vehicle control device according to the fourth aspect of the present disclosure, in a case in which it has been determined that the portable terminal is present inside the vehicle cabin, execution of autonomous travel control that permits a driver to behave in a manner in which it is not possible to check the surroundings of the vehicle, is enabled. Since, as a result, autonomous travel control is executed after a state in which notification of vehicle information can be provided via the portable terminal has been secured, safety during autonomous travel can be increased.

A vehicle control device according to a fifth aspect of the present disclosure is the configuration described in the fourth aspect, in which, in a case in which it has been determined at the determination section that the portable terminal is present inside the vehicle cabin, the execution section activates a camera installed in the portable terminal, refers to image data captured by the camera and to facial authentication data recorded in advance for the driver, attempts to detect a face of the driver from the image data, and in a case in which the face of the driver has been detected from the image data, determines that execution of the autonomous travel control has been approved and enables execution of the autonomous travel control.

In the vehicle control device according to the fifth aspect of the present disclosure, in a case in which it is determined that the portable terminal is present inside the vehicle cabin, a camera installed in the portable terminal is activated. Moreover, the vehicle control device refers to image data captured by the camera and to facial authentication data recorded in advance for the driver, and attempts to detect the face of the driver from the image data. Further, in a case in which the face of the driver has been detected from the image data, the vehicle control device determines that execution of autonomous travel control has been approved, and enables execution of autonomous travel control that permits a driver to behave in a manner in which it is not possible to check the surroundings of the vehicle. As a result, execution of autonomous travel control can be enabled based on the fact that the portable terminal is present inside the vehicle cabin and on the fact that execution of autonomous travel control has been approved by means of facial authentication of the driver. As a result, notification of the vehicle information can be appropriately provided to the portable terminal held by the driver, enabling safety during autonomous travel to be increased.

A vehicle control method according to a sixth aspect of the present disclosure includes: in a vehicle configured to enable autonomous travel control that permits a driver to behave in a manner in which it is not possible to check surroundings of the vehicle, determining whether or not a portable terminal configured to receive notification of vehicle information is present inside a vehicle cabin before the autonomous travel control is executed; and in a case in which it has been determined that the portable terminal is not present inside the vehicle cabin, providing notification, via an onboard unit, that notification of the vehicle information cannot be provided from the portable terminal.

In the vehicle control method according to the sixth aspect of the present disclosure, as described above, the driver can be prompted to check whether or not the portable terminal is present inside the vehicle cabin.

As described above, in the vehicle control device and the vehicle control method according to the present disclosure, in a vehicle that is capable of autonomous travel control that permits a driver to behave in a manner in which it is not possible to check the surroundings of the vehicle, the driver can be prompted to check whether or not the portable terminal that receives notification of vehicle information is present inside the vehicle cabin.

BRIEF DESCRIPTION OF THE DRAWINGS

Exemplary embodiments of the present invention will be described in detail based on the following figures, wherein:

FIG. 6 is a diagram illustrating an example of notification information provided via a portable terminal;

DETAILED DESCRIPTION

Explanation follows regarding a system S according to the present exemplary embodiment, with reference to FIGS. 1 to 9. The system S according to the present exemplary embodiment is a system that prompts a driver P to check whether or not a portable terminal 30 that receives a notification of vehicle information is present inside the vehicle cabin before predetermined autonomous travel control is executed in a vehicle 20.

Figure 1:
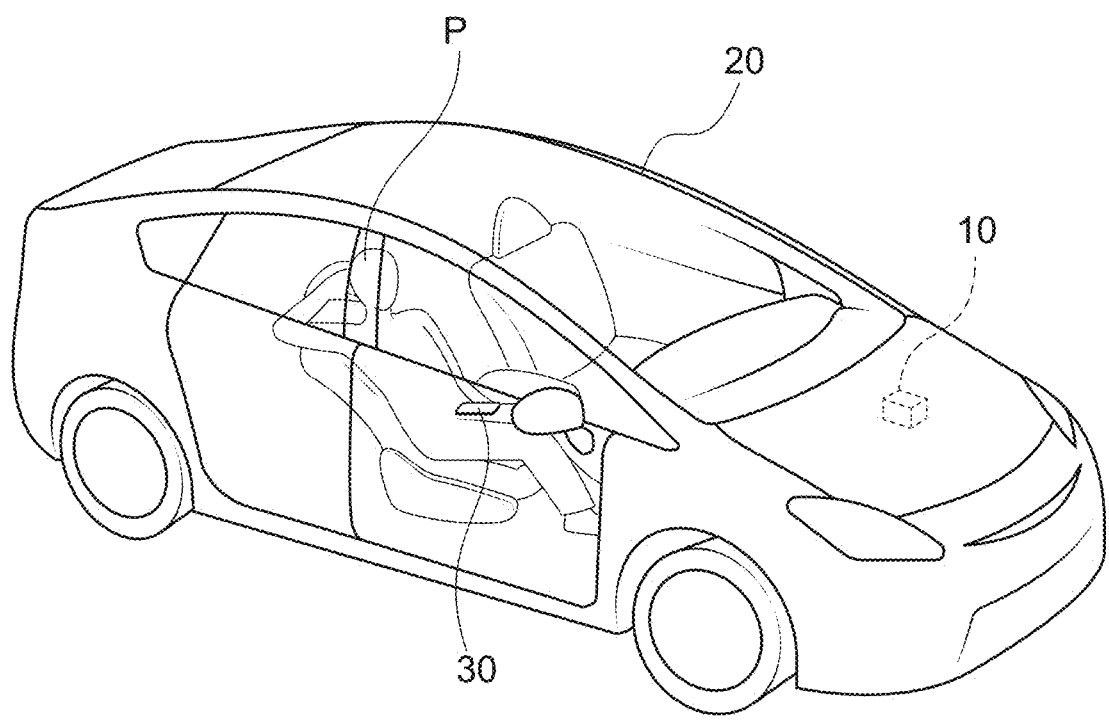
FIG. 1 is a diagram illustrating a schematic configuration of a system configured by a vehicle control device according to the present exemplary embodiment.

As illustrated in FIG. 1, in the system S, a vehicle 20 and a portable terminal 30 of a driver P are connected so as to be capable of communicating with each other according to a predetermined communication protocol. Moreover, in the system S, a smart key 50 of the vehicle 20 is connected so as to be capable of communicating with the vehicle 20 and the portable terminal 30 according to a predetermined wireless communication protocol. The vehicle 20 is capable of remotely executing various operations, such as locking and unlocking of a door, and starting of an engine, based on a control command transmitted from the smart key 50 by operation by the driver P or the like. Moreover, in the system S, the vehicle 20, the portable terminal 30, and the server 40 are connected so as to be capable of communicating with each other via a network N.

In the above system S, the driver P is notified of vehicle information transmitted from the vehicle 20 via an onboard unit 25 and the portable terminal 30. In the present exemplary embodiment, a control device 10 controls transmission of notification information to the onboard unit 25 installed in the vehicle 20 and the portable terminal 30. The control device 10 is an example of a vehicle control device.

(Hardware Configuration of Control Device 10)

Figure 2:
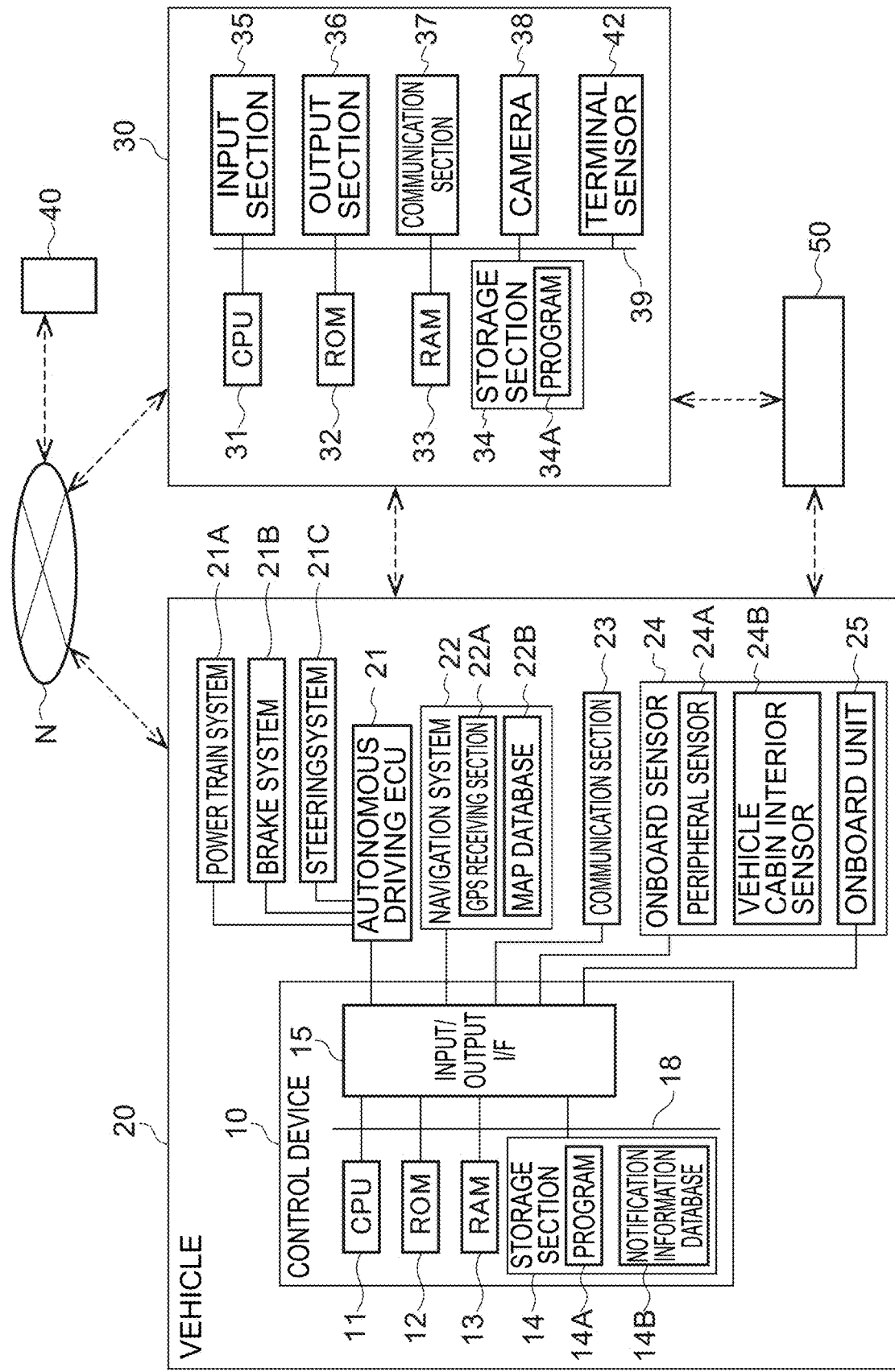
FIG. 2 is a block diagram illustrating a hardware configuration of a vehicle control device.

Explanation follows regarding the hardware configuration of the control device 10. FIG. 2 is a block diagram illustrating the hardware configuration of the system S. The control device 10 is configured by, for example, one or more electronic control units (ECUs) installed in the vehicle 20. As illustrated in FIG. 2, the control device 10 includes a central processing unit (CPU) 11, read only memory (ROM) 12, random access memory (RAM) 13, a storage section 14, and an input/output interface (I/F) 15. These configurations are connected together via a bus 18 so as to be capable of communicating with each other.

The CPU 11 is a central processing unit that executes various programs and controls various sections. Namely, the CPU 11 reads a program from the ROM 12 or the storage section 14, and executes the program using the RAM 13 as a workspace. The CPU 11 controls the respective configurations and performs various computation processing in accordance with a program recorded in the ROM 12 or the storage section 14.

The ROM 12 holds various programs and various data. The RAM 13 serves as a workspace to temporarily store programs and data.

The storage section 14 is configured by a storage device such as a hard disk drive (HDD), a solid state drive (SSD), or flash memory, and holds various programs and various data. The storage section 14 holds a program 14A for causing the CPU 11 to execute notification processing, which is described below. The storage section 14 also holds a notification information database 14B that holds vehicle information to be notified to the onboard unit 25 of the vehicle 20 or the portable terminal 30 of the driver P.

The input/output interface 15 is an interface for connecting the control device 10 to other devices. The input/output interface 15 is connected to an autonomous driving ECU 21, a navigation system 22, a communication section 23, an onboard sensor 24, and the onboard unit 25 installed in the vehicle 20.

The autonomous driving ECU 21 is an electronic control unit that executes various controls relating to autonomous travel of the vehicle 20, and is one component of an autonomous travel system for the vehicle 20. The autonomous driving ECU 21 is connected to a power train system 21A, a brake system 21B, and a steering system 21C of the vehicle 20, and controls autonomous travel of the vehicle 20 through these systems. More specifically, the autonomous driving ECU 21 is connected to sensors and navigation systems, which are described below. The autonomous travel of the vehicle 20 is controlled based on information acquired from the sensors described below or a navigation system 22. The autonomous travel is a travel state in which some or all driving operations are performed automatically to cause the vehicle 20 to travel automatically along the road along which the vehicle 20 is traveling.

The autonomous driving ECU 21 executes autonomous travel control that conforms to a predetermined autonomous driving level defined by, for example, an agency such as the American Society of Automotive Engineers (SAE), the National Highway Traffic Safety Administration (NHTSA) of the U.S. Department of Transportation, or the Society of Automotive Engineers of Japan (JSAE). The predetermined autonomous driving level includes an autonomous driving level in a state in which an autonomous driving device including the autonomous driving ECU 21 replaces all driving operations in a limited region satisfying a specific travel environment condition. At this autonomous driving level and at increased autonomous driving levels, the driver is permitted to behave in a manner in which it is not possible to check the surroundings of the vehicle during autonomous travel.

Note that behavior in a manner in which it is not possible to check the surroundings of the vehicle are operations or tasks other than acts in a state in which the surroundings of the vehicle can be checked, such as operating the host vehicle in relation to driving or travel of the host vehicle, or checking and monitoring the surroundings of the host vehicle for driving or travel. For example, behavior whereby a driver eats and drinks inside a vehicle cabin or behavior whereby a portable terminal is operated corresponds to behavior in a manner in which it is not possible to check the surroundings of the vehicle.

The autonomous driving ECU 21, based on position information, map information, and guidance path information for the vehicle 20 of the navigation system 22, which is described below, enables autonomous travel by automatically causing the vehicle 20 to travel toward a preset destination without the driver P performing driving operations. Moreover, for example, the autonomous driving ECU 21 transmits information relating to execution or change of autonomous travel control to the navigation system 22.

Note that the autonomous driving ECU 21 may be omitted, and the control device 10 may configure the autonomous driving ECU.

The navigation system 22 performs guidance for driving the vehicle 20 to a destination set by the driver P. The navigation system 22 includes, for example, a GPS receiving section 22A for measuring position information of the vehicle 20, and a map database 22B that holds map information.

The navigation system 22 recognizes the travel road and travel lane traveled by the vehicle 20 based on the position information of the vehicle 20 measured by the GPS receiving section 22A and the map information in the map database 22B. The navigation system 22 calculates a route from a position of the vehicle 20 to a destination, and provides guidance to the driver P regarding this route by means of display on a display included in the onboard unit 25, which is described below, and sound output from a speaker. The navigation system 22 transmits, for example, position information of the vehicle 20, information relating to the travel path of the vehicle 20, and information relating to the guidance route of the vehicle 20, to the control device 10.

Moreover, the navigation system 22 transmits vehicle information including information relating to execution or change of autonomous travel control, information relating to alerting the driver during autonomous travel, requests to the driver relating to autonomous travel, and the like, to the control device 10 and the portable terminal 30 via the communication section 23, which is described below.

The communication section 23 is an interface for communicating with other devices. For example, a wired communication protocol such as Ethernet (registered trademark) or FDDI, or a wireless communication protocol such as 4G, 5G, Bluetooth (registered trademark), or Wi-Fi (registered trademark) is used for this communication. These protocols are examples of predetermined communication protocols. In the present exemplary embodiment, the vehicle 20 and the portable terminal 30 of a user recorded in advance as a driver of the vehicle 20 are connected so as to be capable of communicating with each other via the communication section 23.

An onboard sensor 24 includes a peripheral sensor 24A for acquiring information on the surroundings of the vehicle 20 (forward, rearward, right, left), and a vehicle cabin interior sensor 24B for acquiring information on the interior of the vehicle cabin. As an example, the peripheral sensor 24A is configured including at least one of a camera that captures an image of the surroundings of the vehicle, a millimeter-wave radar, an ultrasonic sensor, LiDAR (Light Detection and Ranging) or the like, and detects the peripheral environment of the vehicle. Moreover, as an example, the vehicle cabin interior sensor 24B is configured including at least one of a camera that captures an image of the interior of the vehicle cabin, an acceleration sensor, a yaw rate sensor, a temperature sensor, a microphone, or the like.

The onboard sensor 24 enables predetermined physical quantities relating to states of the vehicle 20 to be detected. In the present exemplary embodiment, based on the physical quantity detected by the onboard sensor 24, it is possible to determine whether or not the portable terminal 30 of the driver P is present inside the cabin of the vehicle 20. Note that there is no particular limitation on predetermined physical quantities relating to states of the vehicle. For example, the physical quantity may be a physical quantity relating to a travel state such as acceleration or an inclination angle of the vehicle 20. Alternatively, for example, the physical quantity may be one that can be detected in relation to a temperature inside the vehicle cabin, sound inside the vehicle cabin, or the environment around the vehicle.

The onboard unit 25 is configured by a device that is capable of outputting information transmitted from the control device 10 to the driver P inside the vehicle cabin. For example, it can be configured by a display, a speaker, an indicator light, a steering wheel, a seat for seating, a seatbelt, or the like.

(Hardware Configuration of Portable Terminal 30)

Next, explanation follows regarding the hardware configuration of the portable terminal 30. The portable terminal 30 is configured by, for example, a smartphone, a tablet terminal, or the like, and is capable of being brought into and taken out from the vehicle cabin. The portable terminal 30 includes a CPU 31, a ROM 32, a RAM 33, a storage section 34, an input section 35, an output section 36, a communication section 37, a camera 38, and a terminal sensor 42. These respective configurations are connected together through a bus 39 so as to be capable of communicating with each other.

The CPU 31 is a central processing unit that reads a program from the ROM 32 or the storage section 34, and executes the program using the RAM 33 as a workspace. The CPU 31 controls the respective configurations and performs various computation processing in accordance with a program recorded in the ROM 32 or the storage section 34.

The ROM 32 holds various programs and various data. The RAM 33 serves as a workspace to temporarily store programs and data.

The storage section 34 is configured by a storage device such as a hard disk drive (HDD), a solid state drive (SSD), or flash memory, and holds various programs and various data. As described below, the storage section 34 holds a program 34A for causing the CPU 31 to output various information transmitted from the control device 10 and the vehicle 20 to the portable terminal 30.

The input section 35 includes a pointing device such as a mouse, a keyboard, a microphone, a camera, and the like, and is used to perform various kinds of input.

The output section 36 is, for example, a liquid crystal display or a speaker, and outputs various information. In a case in which the output section 36 is configured by a display, a touch panel method may be adopted to function as the input section 35.

The communication section 37 is an interface for communicating with other devices. For example, a wired communication protocol such as Ethernet (registered trademark) or FDDI, or a wireless communication protocol such as 4G, 5G, Bluetooth (registered trademark), or Wi-Fi (registered trademark) is used for this communication.

The terminal sensor 42 is configured by a sensor for detecting a predetermined physical quantity relating to a state of the portable terminal. The terminal sensor 42 includes at least one of an acceleration sensor, a yaw rate sensor, a camera, a millimeter-wave radar, an ultrasonic sensor, LiDAR (Light Detection and Ranging), a temperature sensor, a microphone, or the like. Note that there is no particular limitation on predetermined physical quantities relating to states of the portable terminal 30. For example, various physical quantities such as acceleration or an inclination angle of the portable terminal 30, a temperature around the terminal, peripheral sounds, and physical quantities of objects present in the periphery correspond to "predetermined physical quantities relating to states of the portable terminal 30".

(Functional Configuration of Control Device 10)

Figure 3:
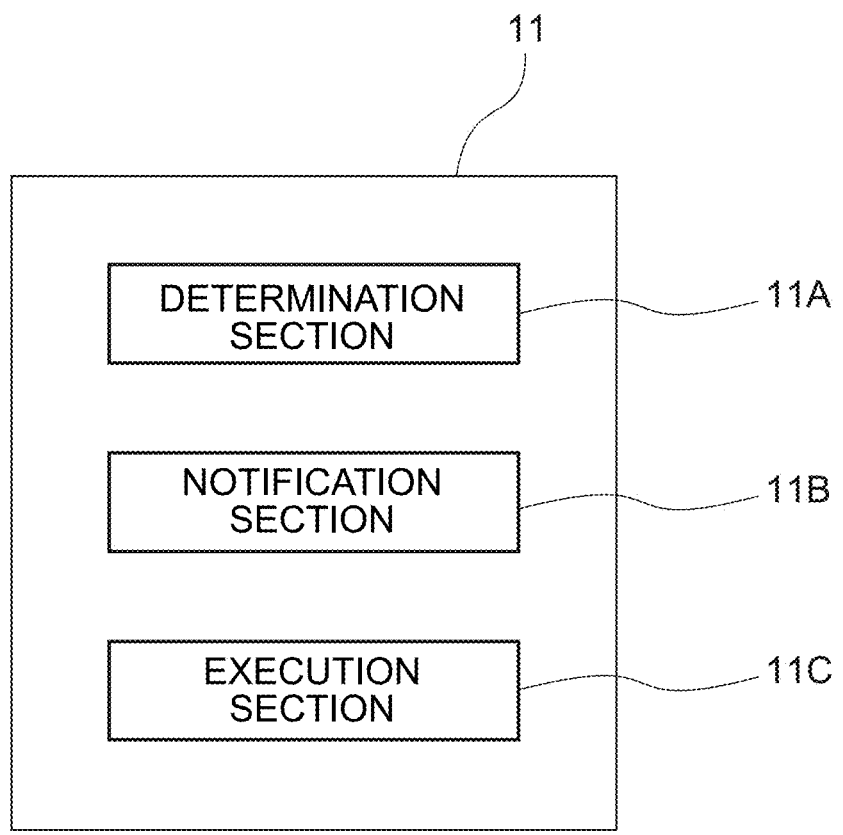
FIG. 3 is a block diagram illustrating an example of a functional configuration of a vehicle control device.

Next, explanation follows regarding the functional configuration of the control device 10. FIG. 3 is a block diagram illustrating an example of the functional configuration of the control device 10.

A determination section 11A determines whether or not the portable terminal 30 that receives notification of vehicle information is present inside the vehicle cabin before execution of autonomous travel control that permits the driver to behave in a manner in which it is not possible to check the vehicle surroundings of the vehicle 20. An example of "autonomous travel control that permits the driver to behave in a manner in which it is not possible to check the vehicle surroundings of the vehicle 20" is autonomous driving at a level of three or higher, as defined by the American Society of Automotive Engineers (SAE).

Although there are no particular limitations on the method for determining whether or not the portable terminal 30 is present inside the vehicle cabin, in a case, for example, in which the vehicle 20 and the portable terminal 30 are connected so as to be capable of communicating with each other according to a predetermined communication protocol, the determination section 11A may determine that the portable terminal 30 of the driver P is present inside the vehicle cabin.

Alternatively, the determination section 11A may determine that the portable terminal 30 is present inside the vehicle cabin in a case in which the detection value of the onboard sensor 24 installed in the vehicle 20 and the detection value of the terminal sensor 42 installed in the portable terminal 30 match with respect to a predetermined physical quantity. Note that the term "match" as used herein is not limited to cases in which the detected values are perfectly coincident, and is a broad concept including cases in which they match within a predetermined error range.

In a case in which the determination section 11A determines that the portable terminal 30 is not present inside the vehicle cabin, a notification section 11B provides notification, via the onboard unit 25, that notification of vehicle information relating to autonomous travel of the vehicle 20 from the portable terminal 30 cannot be performed. In the example illustrated in FIG. 4, by displaying the text information "Notification cannot be provided from the portable terminal" on the display 25A installed at the vehicle front side of the driving seat (not illustrated), the driver P is prompted to carry the portable terminal 30 in an appropriate state. However, there is no limitation thereto, and the notification section 11B may output audio information to a speaker serving as the onboard unit 25 to provide notification, or the steering and the seating seat may be vibrated to encourage the portable terminal to be carried in an appropriate state.

Moreover, in a case in which autonomous travel control that permits the driver to behave in a manner in which it is not possible to check the vehicle surroundings of the vehicle 20 has been executed, the notification section 11B provides notification of the vehicle information relating to the autonomous travel from at least one of the onboard unit 25 installed in the vehicle 20 or the portable terminal 30 of the driver P. The vehicle information (notification information) provided from the onboard unit 25 and the portable terminal 30 is stored in a notification information database 14B. As illustrated in FIG. 6, the notification information database 14B holds various notification information in association with items such as "Classification of Notifications", "Event Items", "User Actions", and the like. "Classification of Notifications" includes, for example, "Driving Change Warning", "Driving Change Notification", "System State, Transition (MRM)", "System State, Transition (MRC)", "Functional Proposal from System", and "Vehicle State Notification". Specific events corresponding to the respective items included in this "Classification of Notifications" are set in the "Event Items".

The events corresponding to a "Driving Change Warning" are set as situations in which a driving change from the vehicle 20 to the driver P is made in sudden circumstances. More specifically, the vehicle 20 departing from an autonomous driving area, encountering a hazardous situation, system failure or system malfunction, sudden weather deterioration, the autonomous driving level transitioning to a lower level than the current autonomous driving level, and accidents are set as corresponding events. These events are set as situations in which it suddenly becomes difficult to continue autonomous travel at the current autonomous driving level, and it is required that the driver P respond immediately. Accordingly, under "User Action", these are associated with the "Immediate Response Required" item.

The events corresponding to "Driving Change Notification" are set as situations in which a driving change from the vehicle 20 to the driver P is performed in non-sudden circumstances. More specifically, the vehicle 20 departing from an autonomous driving area, encountering a hazardous situation, system failure or system malfunction, sudden weather deterioration, the autonomous driving level transitioning to a lower level than the current autonomous driving level, and accidents are included. These events are set as cases in which manual driving is expected to be required when traveling through a predetermined area, and it is required that the driver P respond before reaching the predetermined area. Accordingly, under "User Action", these are associated with the item "Response Required by Manual Driving Area".

As an event that corresponds to "System State, Transition (MRM)", the travel control state of the vehicle 20 transitioning to a minimum risk maneuver (MRM) is set. The MRM is a countermeasure for cases in which a phenomenon has occurred such that travel cannot be performed safely, and refers to vehicle motion control as far as an MRC, which is described below.

As an event that corresponds to "System State, Transition (MRC)", the travel control state of the vehicle 20 transitioning to a minimum risk condition (MRC) is set. The MRC is a safety state that the vehicle ultimately targets as a countermeasure for cases in which a phenomenon has occurred such that autonomous driving functionality is abnormal and driving cannot be performed safely. Generally, this refers to a stop state in a situation in which the risk of an accident is sufficiently low.

When an event has occurred that corresponds to the above "System State, Transition (MRM)" or "System State, Transition (MRC)", since it is unlikely that there will be intervention by specific actions by the user (driver P), under "User Action", these are associated with the "None" item. Note that since the "System State, Transition (MRM)" is a stage prior to reaching the MRC, action from the user may be made required as necessary.

As events corresponding to "Functional Proposal from System", overtaking, passing, lane change, transition of the autonomous driving level to a higher level than the current autonomous driving level, route selection via the navigation system 22, and deceleration at toll gates on toll roads, are set. These events can be executed under autonomous travel control, and since there is no need to switch driving to manual driving, the approval of the driver P is sufficient. Accordingly, under "User Action", these are associated with the item "Approval".

The remaining battery amount and the remaining fuel amount are set as events corresponding to "Vehicle State Notification". These events are events that are not involved in the execution of autonomous travel control, and notifying the driver P is all that is required. Accordingly, under "User Action", these are associated with the item "Only Notification".

The notification section 11B refers to the vehicle information transmitted from the autonomous driving ECU 21 and the navigation system 22, as well as to the notification information database 14B, and transmits notification information to the onboard unit 25 and the portable terminal 30. The driver P is notified of the transmitted notification information via the onboard unit 25 and the portable terminal 30.

Figure 7:
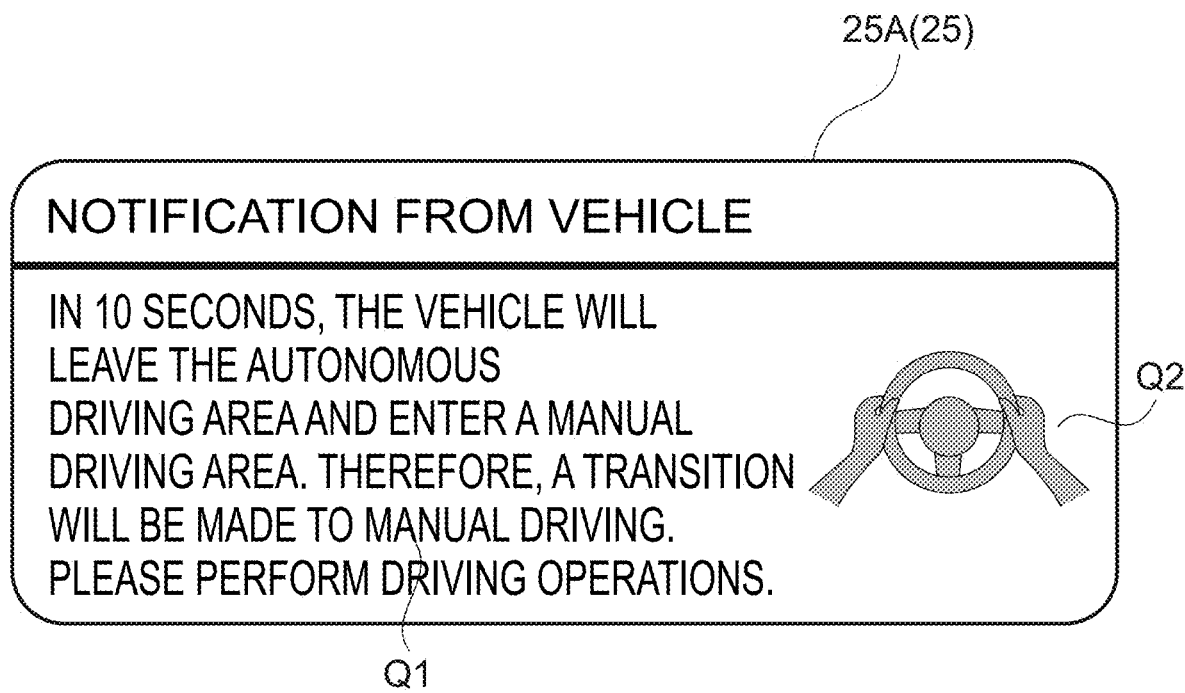
FIG. 7 is a diagram illustrating an example of a notification performed via an onboard unit.
Figure 8:
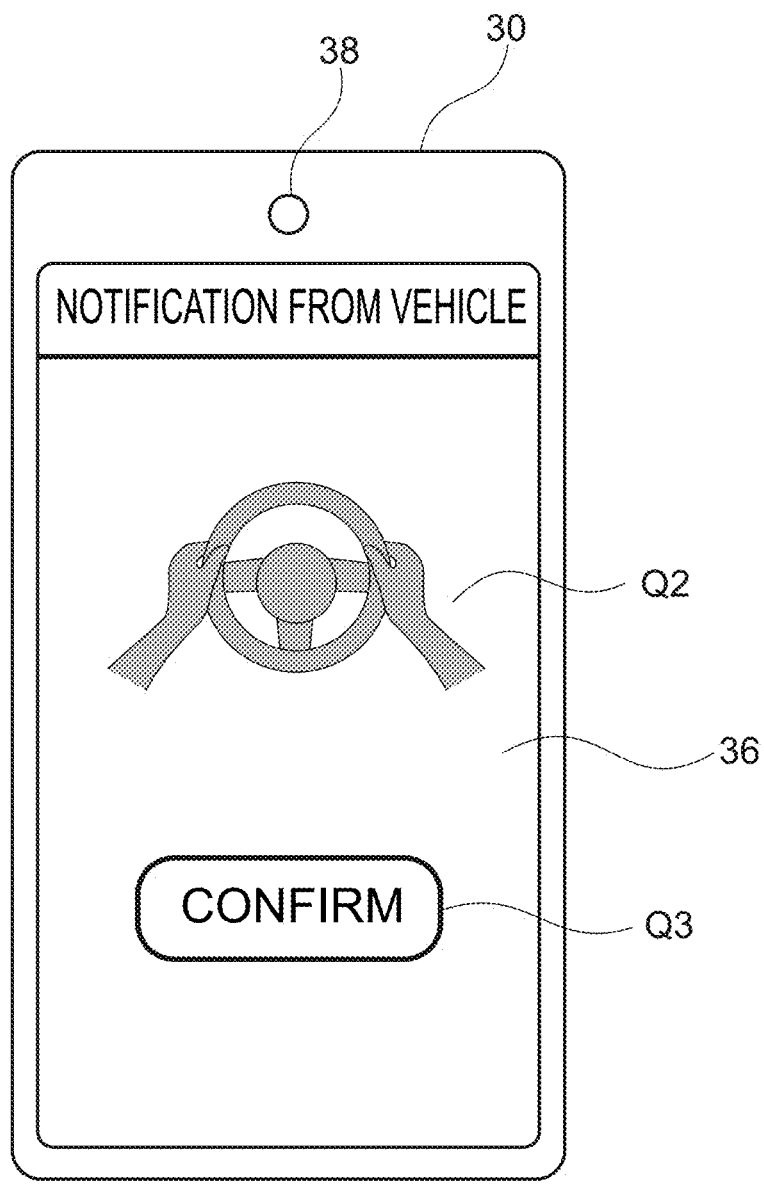
FIG. 8 is a diagram illustrating an example of a notification performed via a portable terminal.

Specifically, explanation follows regarding an example in which notification is provided of information requesting a driving change from the vehicle 20 to the driver P, with reference to FIG. 7 and FIG. 8. Here, explanation follows regarding a case in which, in conjunction with the navigation system 22, a request for a driving switch is made to the driver P in a case in which the vehicle 20 is scheduled to enter a manual driving area from an autonomous driving area. Since this notification does not request a sudden change of driving, in the notification information database 14B, it is classified as "Driving Change Notification" and corresponds to an event of "departure from an autonomous driving area". Accordingly, the user action that the driver P takes over the driving is required before the vehicle 20 reaches the manual driving area.

As illustrated in FIG. 7, inside the vehicle cabin, as a notification from the vehicle to the display 25A serving as the onboard unit 25, text information Q1 requesting a driving change and an icon image Q2 indicating the driving change request are displayed. Moreover, the message requesting a driving change includes information relating to the time remaining until the manual driving area is reached. Further, as a notification from the vehicle, at the portable terminal 30 of the driver P, the icon image indicating the driving change request and a confirmation operation object Q3 that requests confirmation in response to the driving change notification are displayed. When the driver P performs an input operation on the confirmation operation object Q3, confirmation information is transmitted from the portable terminal 30. Upon receiving the confirmation information, the vehicle 20 determines that the driver P has confirmed the request for a driving change from the vehicle 20.

As with the above-described notification, it is preferable that the amount of information provided via the portable terminal 30 be configured to be less than the amount of information provided via the onboard unit 25. In the above example, while the information output from the display 25A includes text information Q1 indicating a driving change, in the information displayed on the portable terminal 30, the text information Q1 indicating the driving change is omitted, and only the icon image Q2 is displayed. This enables the smaller-sized portable terminal to be made to present information that is easy to visually understand.

Moreover, as with the above notification, in a case in which the vehicle 20 requests the driver P to participate in driving operations, it is preferable to request a confirmation operation by the driver P in response to the notification, via the portable terminal 30. In the above example, the confirmation operation object Q3 is displayed on the portable terminal 30, and an input operation with respect to the confirmation operation object Q3 is received by the vehicle 20. This enables the accuracy of notification to the driver P to be improved, enabling the safety of travel to be increased.

An execution section 11C enables execution of autonomous travel control that permits the driver to behave in a manner in which it is not possible to check the vehicle surroundings, in a case in which the determination section 11A determines that the portable terminal 30 is present inside the vehicle cabin.

Figure 5:
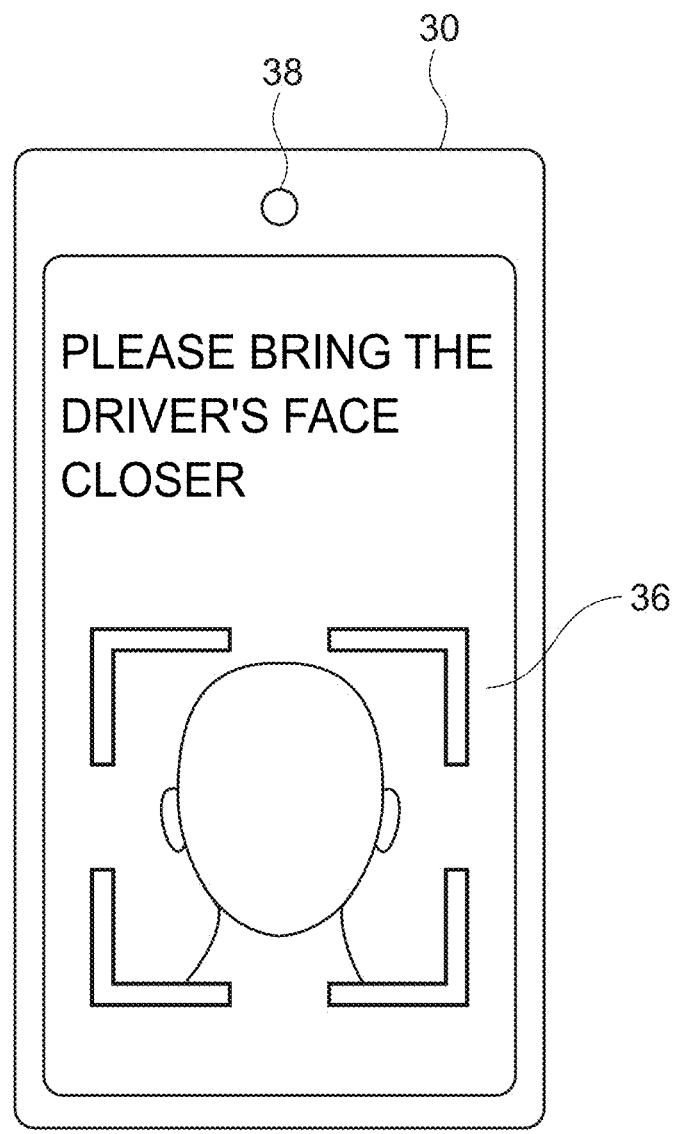
FIG. 5 is a diagram illustrating an example of facial authentication performed via a portable terminal.

In a case in which the determination section 11A has determined that the portable terminal 30 of the driver P is present inside the vehicle cabin, the execution section 11C activates the camera 38 installed in the portable terminal 30 and facial authentication of the driver P is performed. For example, as illustrated in FIG. 5, the camera 38 of the portable terminal 30 is automatically activated, and the output section 36 (in FIG. 5, the display) displays the text information, "Please bring the driver's face closer", so as to cause the driver operating the portable terminal 30 to enable capture of an image of their face.

The execution section 11C refers to image data captured by the camera 38 of the portable terminal 30 and to facial authentication data recorded in advance for the driver P, and attempts to detect the face of the driver P from the captured image data. Note that the facial authentication data may be stored in the storage section 14 of the control device 10, or may be acquired from a storage of the vehicle 20, an external server, or the like.

In a case in which the face of the driver P is detected from the image data captured by the camera 38, the execution section 11C determines that the driver P has consented to execution of autonomous travel control, and transmits autonomous travel control execution permission information to the autonomous driving ECU 21. The autonomous driving ECU 21 receives the execution permission information for autonomous travel control, whereby autonomous travel control that permits the driver to behave in a manner in which it is not possible to check the vehicle surroundings is executed at a predetermined timing.

Figure 9:
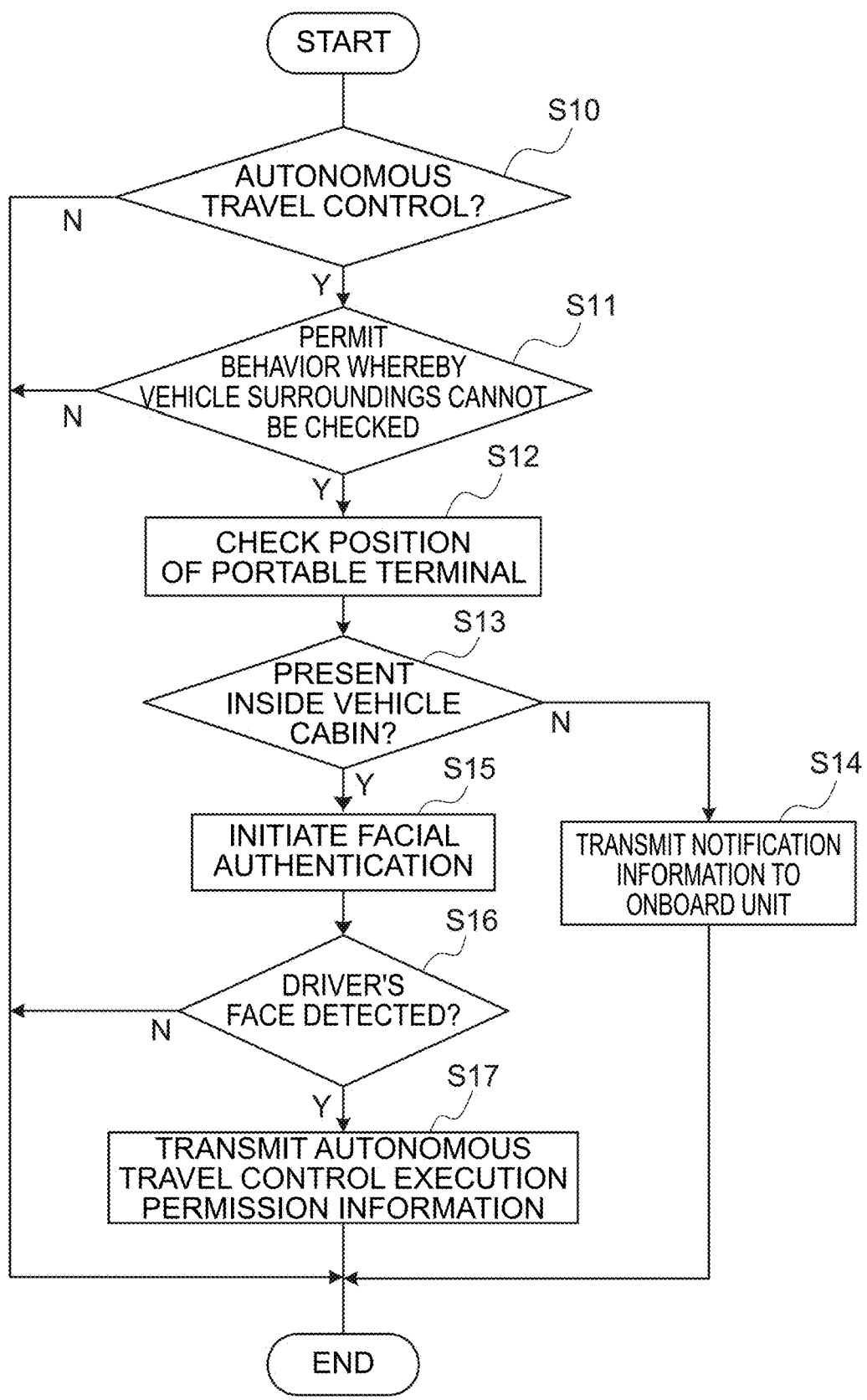
FIG. 9 is a flow chart illustrating a flow of notification processing.

FIG. 9 is a flowchart illustrating an example of notification processing in which the control device 10 performs notification to prompt the driver P to check whether or not the portable terminal 30 that receives notification of vehicle information is present inside the vehicle cabin. The notification processing is performed by the CPU 11 reading the program 14A from the storage section 14, and expanding and executing the program 14A in the RAM 13.

As illustrated in FIG. 9, at step S10, based on vehicle information transmitted from the navigation system 22, it is determined whether or not execution of autonomous travel control is scheduled in a travel plan to a destination of the vehicle 20. Note that the CPU 11 may determine whether or not execution of autonomous travel control is scheduled in a travel plan within a predetermined time from the current time. In a case in which it is determined that execution of autonomous travel control is scheduled, the determination of step S10 is affirmative, and the processing proceeds to step S11. On the other hand, in a case in which it is determined that execution of autonomous travel control is not scheduled, the determination at step S10 is negative, and the notification processing is ended.

At step S11, the CPU 11 determines whether or not behavior by the driver in a manner in which it is not possible to check the vehicle surroundings is permitted under the scheduled autonomous travel control. In a case in which it is determined that behavior by the driver in a manner in which it is not possible to check the vehicle surroundings is permitted, the determination of step S11 is affirmative, and the processing proceeds to step S12. On the other hand, in a case in which it is determined that behavior by the driver in a manner in which it is not possible to check the vehicle surroundings is not permitted, the determination at step S11 is negative, and the notification processing is ended.

At step S12, the CPU 11 checks the position of the portable terminal 30 based on the functionality of the determination section 11A.

Figure 4:
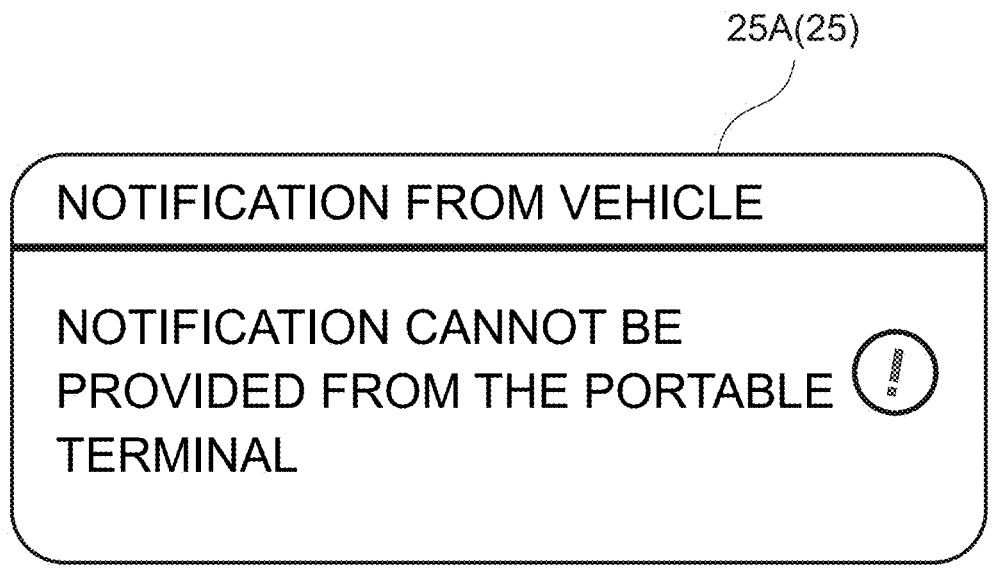
FIG. 4 is a diagram illustrating an example of a notification performed via an onboard unit.

At step S13, based on the functionality of the determination section 11A, the CPU 11 determines whether or not the portable terminal 30 is present inside the vehicle cabin. In a case in which it is determined that the portable terminal 30 is not present inside the vehicle cabin, the determination at step S13 is negative, and the processing proceeds to step S14. At step S14, the CPU 11 transmits information to the onboard unit 25 providing notification to the effect that notification of vehicle information cannot be provided from the portable terminal 30, and causes the driver P to be notified of this via the onboard unit 25 (FIG. 4).

On the other hand, in a case in which it is determined at step S13 that the portable terminal 30 is present inside the vehicle cabin, the determination at step S13 is affirmative, and the processing proceeds to step S15.

At step S15, based on the functionality of the execution section 11C, the CPU 11 initiates facial authentication of the driver P via the portable terminal 30. More specifically, the camera 38 installed in the portable terminal 30 is activated, image data captured by the camera 38 and facial authentication data recorded in advance for the driver P are referred to, and an attempt is made to detect the face of the driver P from the captured image data (FIG. 5).

At step S16, the CPU 11 determines whether or not the face of the driver P has been detected from the image data captured by the camera 38. In a case in which the face of the driver P has been detected, the determination at step S16 is affirmative, and the processing proceeds to step S17. On the other hand, in a case in which the face of the driver P has not been detected, the determination at step S16 is negative, and the notification processing is ended.

At step S17, the CPU 11 transmits execution permission information to the autonomous driving ECU 21 of the vehicle 20 in relation to execution of autonomous travel control that permits the driver to behave in a manner in which it is not possible to check the vehicle surroundings.

(Mechanism and Effects)

As described above, in the control device 10 according to the present exemplary embodiment, prior to execution of autonomous travel control that permits the driver to behave in a manner in which it is not possible to check the vehicle surroundings, it is determined whether or not the portable terminal 30 that receives notification of vehicle information is present in the vehicle cabin. Moreover, in a case in which it is determined that the portable terminal 30 is not present inside the vehicle cabin, notification is provided via the onboard unit 25 that notification of vehicle information cannot be provided from the portable terminal 30. This enables the driver P to be prompted to check whether or not the portable terminal 30 is present inside the vehicle cabin.

For example, the control device 10 can determine that the portable terminal 30 is present inside the vehicle cabin in a case in which the vehicle 20 and the portable terminal 30 are connected so as to be capable of communicating with each other. Since, as a result, it is determined that the portable terminal 30 is present inside the vehicle cabin in a case in which the portable terminal 30 is in a state in which it is possible to receive notification of vehicle information, the portable terminal 30 can reliably receive vehicle information, enabling safety during autonomous travel to be increased.

Moreover, for example, predetermined physical quantities are detected using the onboard sensor 24 installed in the vehicle 20 and the terminal sensor 42 installed in the portable terminal 30. In a case in which the detection values of these sensors match each other, the portable terminal 30 may be determined to be inside the vehicle cabin. Namely, a case in which the detection values of the onboard sensor 24 and the terminal sensor 42 coincide indicates that the portable terminal 30 is disposed in the same environment as the vehicle 20. Since it is possible to determine whether or not the portable terminal 30 is present inside the vehicle cabin in consideration of whether or not the peripheral environment of the portable terminal 30 matches the environment inside the vehicle cabin, it is possible to perform highly accurate determination.

Moreover, in the present exemplary embodiment, in a case in which it is determined that the portable terminal 30 is present inside the vehicle cabin, the execution of autonomous travel control that permits the driver to behave in a manner in which it is not possible to check the vehicle surroundings, is enabled. This enables safety during autonomous travel to be increased because autonomous travel control is executed after a state in which notification of vehicle information can be provided via the portable terminal 30 has been secured.

Moreover, in the present exemplary embodiment, in a case in which it is determined that the portable terminal 30 is present inside the vehicle cabin, the camera 38 installed in the portable terminal 30 is activated. Moreover, the control device 10 refers to image data captured by the camera 38 and to facial authentication data recorded in advance for the driver P, and detects the face of the driver P from the image data. Moreover, in a case in which the face of the driver P has been detected from the captured image data, it is determined that the execution of autonomous travel control has been approved, and the control device 10 enables execution of autonomous travel control that permits the driver to behave in a manner in which it is not possible to check the vehicle surroundings. Therefore, execution of autonomous travel control can be enabled based on the fact that the portable terminal 30 is present inside the vehicle cabin and on the fact that execution of autonomous travel control has been approved by facial authentication of the driver P. As a result, notification of vehicle information can be appropriately provided to the portable terminal 30 held by the driver P, enabling safety during autonomous travel to be increased.

Although the configuration adopted is such that the control device 10 is installed in the vehicle 20 in the exemplary embodiment described above, there is no limitation thereto. It may be configured by an external device such as a server.

Further, the notification processing described above may be executed not only at a predetermined control cycle but also in a case in which the communication situation between the vehicle 20 and the portable terminal 30 has deteriorated. Alternatively, for example, a configuration may be adopted in which the notification processing is executed, the position of the portable terminal is checked in advance, and the notification performed, at a timing at which the ignition switch of the vehicle is switched ON or at a timing at which the autonomous travel system is activated.

Moreover, a configuration may be adopted in which the navigation system 22 sets a travel route to a destination, and in a case in which the relevant travel route includes a section in which autonomous travel that permits the driver to behave in a manner in which it is not possible to check the vehicle surroundings, is enabled, the notification processing is executed.

Moreover, in the present disclosure, the method for determining whether or not the portable terminal 30 is present inside the vehicle cabin is not limited to the method described in the foregoing exemplary embodiments. For example, the determination may be performed by analyzing an image captured by a camera that monitors the inside of the vehicle cabin, a camera that images a driver, or the like. Even in a case in which it has been confirmed that the portable terminal is present inside the vehicle cabin by a method of comparing a detection value of this kind of monitoring system inside the vehicle cabin or the onboard sensor described above with a detection value of the terminal sensor, in a case in which the communication state of the portable terminal is vulnerable, a case in which the power of the portable terminal is switched off, or a case in which the battery level of the portable terminal is below a threshold value, the configuration may be such that it is determined that the portable terminal is not present inside the vehicle cabin.

Moreover, in order for the vehicle side to check that a smart key 50 is present inside the vehicle cabin and that the door of the vehicle 20 is locked or unlocked from a distant position, the smart key 50 usually includes a built-in battery and transmits an authentication signal. Using this functionality, the portable terminal 30 may detect that the smart key 50 of the vehicle 20 is nearby, the portable terminal 30 notify the server 40 that the smart key 50 has been detected by the portable terminal 30, and the portable terminal 30 be determined to be inside the vehicle cabin by transmission of a signal from the server 40 to the control device 10 via the communication section 23.

Note that the notification processing executed by the CPU 11 reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The notification processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Although explanation has been given regarding an example in which the program 14A is stored (installed) in advance in the storage section 14 in the above exemplary embodiment, there is no limitation thereto. The program 14A may be provided in a format recorded on a recording medium such as compact disc read only memory (CD-ROM), digital versatile disc read only memory (DVD-ROM), or universal serial bus (USB) memory. Alternatively, the program 14A may be provided in a format downloadable from an external device over a network.

What is claimed is:

1. A vehicle control device, comprising:
   at least one processor, wherein the processor is configured to:
   in a vehicle configured to enable autonomous travel control that permits a driver to behave in a manner in which it is not possible to check surroundings of the vehicle,
   determine whether or not execution of the autonomous travel control is scheduled in a travel plan to a destination of the vehicle,
   in a case in which execution of the autonomous travel control is scheduled, determine whether or not a portable terminal configured to receive notification of vehicle information is present inside a vehicle cabin before the autonomous travel control is executed on the travel plan; and
   in a case in which it has been determined that the portable terminal is not present inside the vehicle cabin, provide notification, via an onboard unit, that notification of the vehicle information cannot be provided from the portable terminal before the autonomous travel control is executed on the travel plan.

2. The vehicle control device of claim 1, wherein the processor is configured to determine that the portable terminal is present inside the vehicle cabin in a case in which the vehicle and the portable terminal are communicably connected to each other in accordance with a predetermined communication protocol.

3. The vehicle control device of claim 1, wherein the processor is configured to determine that the portable terminal is present inside the vehicle cabin in a case in which a detection value of an onboard sensor installed in the vehicle and a detection value of a terminal sensor installed in the portable terminal match with respect to a predetermined physical quantity.

4. The vehicle control device of claim 1, wherein the processor is configured to enable execution of the autonomous travel control in a case in which it has been determined that the portable terminal is present inside the vehicle cabin.

5. The vehicle control device of claim 4, wherein the processor is configured to:
   in a case in which it has been determined that the portable terminal is present inside the vehicle cabin, automatically activate a camera installed in the portable terminal, cause a display of the portable terminal to display a message encouraging the driver to capture an image of the driver's face, refer to image data captured by the camera and to facial authentication data recorded in advance for the driver, and attempt to detect a face of the driver from the image data; and
   in a case in which the face of the driver has been detected from the image data, determine that execution of the autonomous travel control has been approved and enable execution of the autonomous travel control.

6. A vehicle control method, comprising:
   in a vehicle configured to enable autonomous travel control that permits a driver to behave in a manner in which it is not possible to check surroundings of the vehicle,
   determine whether or not execution of the autonomous travel control is scheduled in a travel plan to a destination of the vehicle,
   in a case in which execution of the autonomous travel control is scheduled, determining whether or not a portable terminal configured to receive notification of vehicle information is present inside a vehicle cabin before the autonomous travel control is executed on the travel plan; and
   in a case in which it has been determined that the portable terminal is not present inside the vehicle cabin, providing notification, via an onboard unit, that notification of the vehicle information cannot be provided from the portable terminal before the autonomous travel control is executed on the travel plan.

\* \* \* \* \*